(12) United States Patent
Hong et al.

(10) Patent No.: US 9,726,861 B2
(45) Date of Patent: Aug. 8, 2017

(54) VARIABLE FOCUS LENS, AND PREPARING METHOD OF THE SAME

(71) Applicants: Graphene Square Inc., Seoul (KR); SNU R & DB Foundation, Seoul (KR)

(72) Inventors: Byung Hee Hong, Suwon-si (KR); Jun Mo Kang, Bucheon-si (KR)

(73) Assignees: Graphene Square, Inc., Seoul (KR); SNU R&DB Foundation, Seoul (KR)

( * ) Notice: Subject to any disclaimer, the term of this patent is extended or adjusted under 35 U.S.C. 154(b) by 14 days.

(21) Appl. No.: 14/219,529

(22) Filed: Mar. 19, 2014

(65) Prior Publication Data
US 2014/0313588 A1    Oct. 23, 2014

(30) Foreign Application Priority Data
Apr. 19, 2013   (KR) .......................... 10-2013-0043431

(51) Int. Cl.
| | | |
|---|---|---|
| *G02B 13/00* | (2006.01) | |
| *G02B 3/00* | (2006.01) | |
| *G02C 7/08* | (2006.01) | |

(52) U.S. Cl.
CPC .......... *G02B 13/0075* (2013.01); *G02B 3/00* (2013.01); *G02C 7/083* (2013.01)

(58) Field of Classification Search
CPC .... G02B 13/0075; G02B 26/005; G02B 3/00; G02B 3/12; G02B 3/14; G02B 26/004; G02C 7/083; G02C 7/085; G02C 7/101; G02F 2001/291

USPC .............. 359/665–667; 351/159.03, 159.04, 351/159.34, 159.39, 159.4
See application file for complete search history.

(56) References Cited

U.S. PATENT DOCUMENTS

| | | | | |
|---|---|---|---|---|
| 2009/0281389 | A1* | 11/2009 | Iddan ................. | A61B 1/00096 600/167 |
| 2010/0171393 | A1* | 7/2010 | Pei ........................ | H01L 41/094 310/330 |
| 2011/0116171 | A1* | 5/2011 | Kwon ...................... | G02B 3/14 359/666 |
| 2012/0075519 | A1* | 3/2012 | Blasch ................... | G02B 7/102 348/340 |
| 2015/0241608 | A1* | 8/2015 | Shian ...................... | G02B 3/14 359/666 |

OTHER PUBLICATIONS

Uikyum Kim et al.; "A transparent and stretchable graphene-based actuator for tactile display"; Nanotechnology, Mar. 19, 2013; pp. 1-8.
Jianfeng Zang et al., "Multifunctionality and control of the crumpling and unfolding of large-area graphene", Nature Materials, vol. 12, Apr. 2013, pp. 321-325.

* cited by examiner

*Primary Examiner* — Jordan Schwartz
(74) *Attorney, Agent, or Firm* — Greer Burns & Crain Ltd.

(57) ABSTRACT

The present disclosure relates to a variable focus lens containing graphene, a preparing method of the variable focus lens, a focus controlling method of the variable focus lens, and a display device including the variable focus lens.

13 Claims, 10 Drawing Sheets

VARIABLE FOCUS LENS, AND PREPARING METHOD OF THE SAME

CROSS-REFERENCE TO RELATED APPLICATION

This application claims the benefit of Korean Patent Application No. 10-2013-0043431 filed on Apr. 19, 2013, the disclosures of which are incorporated herein by reference.

TECHNICAL FIELD

The present disclosure described herein pertain generally to a variable focus lens containing graphene, a preparing method of the variable focus lens, a focus controlling method of the variable focus lens, and a display device including the variable focus lens.

BACKGROUND

A variable focus lens is a lens of which a refraction index is variable. In a conventional liquid lens as a representative variable focus lens, a focal length has been controlled by roughly two methods. According to a first method, in a state where a liquid material is filled under a polymer film, an electro-mechanical actuator is operated to adjust a volume of the liquid material, so that a shape and/or a height of the polymer film are modified. According to a second method, by electrically controlling a conductive liquid, and phases of two liquids which are nonconductors and are not mixed with each other, a focal length is controlled. In particular, the former method requires a complicated structure such as the liquid, the polymer film, and the electro-mechanical actuator for controlling a volume, and also needs a motor and a fixed support to be additionally synthesized around a lens. Therefore, it is difficult to synthesis a variable focus lens in a small size, and, thus, it is difficult to control micro-scale curves. Further, since the conventional method has used a thin metal thin film as an electrode, it has been limited in synthesis a flexible or transparent electrode.

DISCLOSURE OF THE INVENTION

Problems to be Solved by the Invention

In view of the foregoing problems, present disclosure provides a variable focus lens in which a dielectric elastomer serving as a lens provided between transparent electrodes is moved by generating a potential difference between the transparent electrodes by applying a voltage to graphene used as the transparent electrodes, so that a focus can be changed, a preparing method of the variable focus lens, a focus controlling method of the variable focus lens, and a display device that includes the variable focus lens and can implement 3D display.

However, problems to be solved by the present disclosure are not limited to the above-described problems. Although not described herein, other problems to be solved by the present invention can be clearly understood by those skilled in the art from the following description.

Means for Solving the Problems

In accordance with the first aspect of the present disclosure, a variable focus lens comprises a transparent dielectric elastomer layer, and a transparent electrode layer containing graphene, wherein the transparent electrode layer containing graphene is formed on at least a part of each of both sides of the transparent dielectric elastomer layer.

In accordance with the second aspect of the present disclosure, a preparing method of a variable focus lens comprises forming a transparent electrode layer containing graphene on at least a part of each of both sides of a transparent dielectric elastomer layer.

In accordance with the third aspect of the present disclosure, a focus controlling method of a variable focus lens comprises applying a voltage to the transparent electrodes formed on the both sides of the variable focus lens in accordance with the first aspect of the present disclosure to generate a potential difference between the transparent electrodes so as to vary a focus of the variable focus lens.

In accordance with the fourth aspect of the present disclosure, a display device comprises the variable focus lens in accordance with the first aspect of the present disclosure.

Effect of the Invention

In accordance with the present disclosure, it is possible to prepare a variable focus lens that does not need parts such as a motor or a support and can be synthesized in micro size by using photolithography or electron beam lithography. Further, the variable focus lens in accordance with the present disclosure has an excellent mechanical property, and, thus, damage to electrode caused by movement of a dielectric can be minimized and reliability of the lens can be obtained. Further, graphene contained in the variable focus lens can be patterned and is transparent, and, thus, it is possible to synthesis an electrode having a desired shape and/or size. Further, a single layer of graphene makes it possible to drive the variable focus lens, and, thus, a high light transmittance can be obtained.

BRIEF DESCRIPTION OF THE DRAWINGS

In the detailed description that follows, illustrative embodiments are described as illustrations only since various changes and modifications will become apparent from the following detailed description. The use of the same reference numbers in different figures indicates similar or identical items.

DETAILED DESCRIPTION

Figure 1:
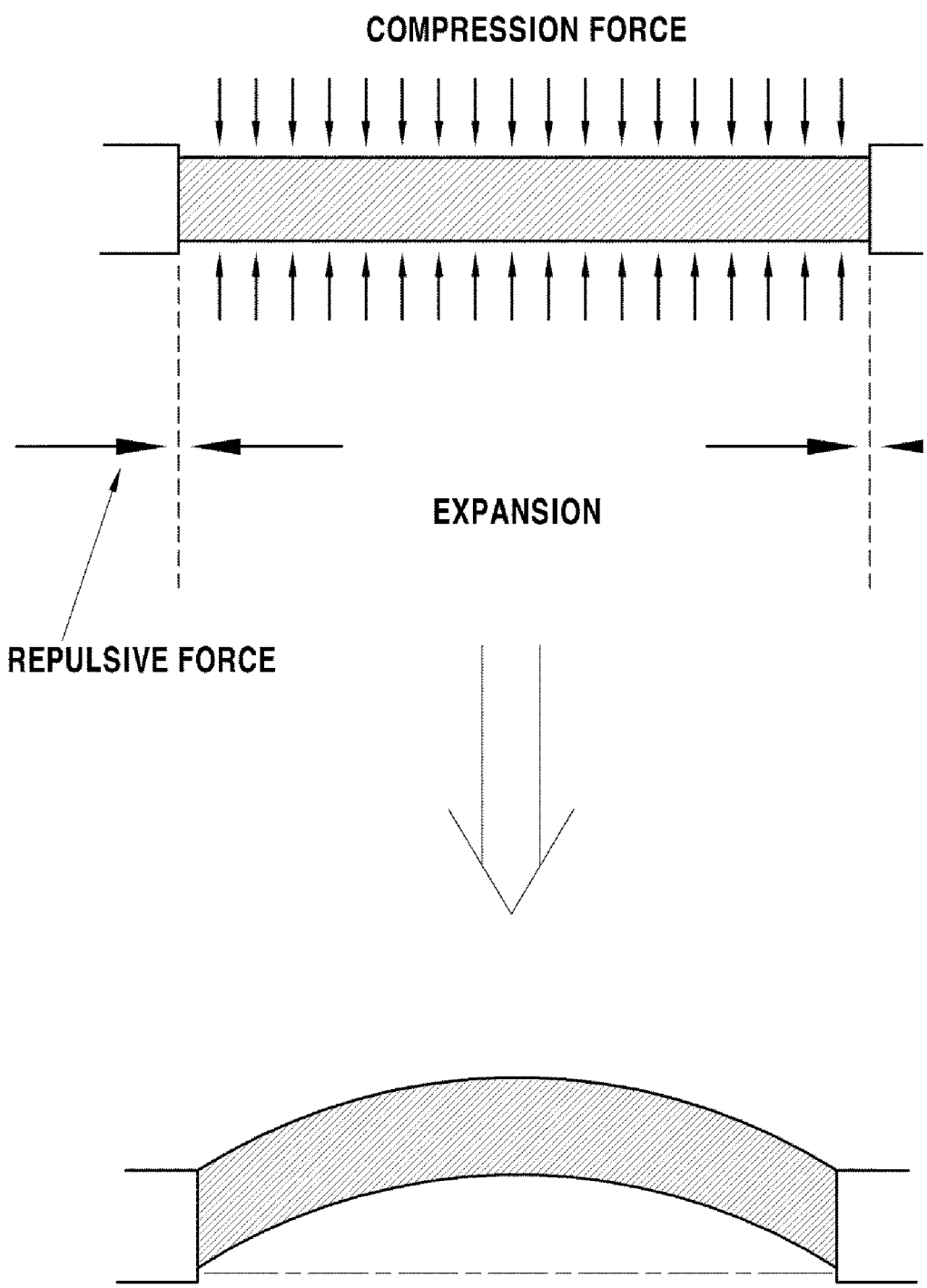
FIG. 1 is a schematic view showing a driving principle of a variable focus lens in accordance with an illustrative embodiment of the present disclosure.

Hereinafter, examples of the present disclosure will be described in detail with reference to the accompanying drawings so that the present disclosure may be readily implemented by those skilled in the art. However, it is to be noted that the present disclosure is not limited to the illustrative embodiments and examples but can be embodied in various other ways. In drawings, parts irrelevant to the description are omitted for simplicity of explanation, and like reference numerals denote like parts through the whole document.

Through the whole of the present disclosure, the term "comprises or includes" and/or "comprising or including" used in the document means that one or more other components, steps, operation and/or existence or addition of elements are not excluded in addition to the described components, steps, operation and/or elements unless context dictates otherwise.

Through the whole of the present disclosure, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole of the present disclosure, the term "on" that is used to designate a position of one element with respect to another element includes both a case that the one element is adjacent to the another element and a case that any other element exists between these two elements.

Through the whole of the present disclosure, the term "combinations of" included in Markush type description means mixture or combinations of one or more components, steps, operations and/or elements selected from a group consisting of components, steps, operation and/or elements described in Markush type and thereby means that the disclosure includes one or more components, steps, operations and/or elements selected from the Markush group.

Through the whole of the present disclosure, a phrase in the form "A and/or B" means "A or B, or A and B".

Hereinafter, illustrative embodiments and examples of the present disclosure will be explained with reference to the accompanying drawings.

In the first aspect of the present disclosure, a variable focus lens comprises a transparent dielectric elastomer layer, and a transparent electrode layer containing graphene, wherein the transparent electrode layer containing graphene is formed on at least a part of each of both sides of the transparent dielectric elastomer layer.

FIG. 1 is a schematic view showing a driving principle of a variable focus lens in accordance with the present disclosure. According to FIG. 1, when a compression force is applied to a dielectric elastomer, the dielectric elastomer expands in X-axis and Y-axis directions. However, if there is a fixed support around the dielectric elastomer to be expanded, inversely a repulsive force is applied in a Z-axis direction, and, thus, the dielectric elastomer is moved upward or downward.

A magnitude of the compression force applied to the dielectric elastomer can be expressed by the following equation.

Compression force:

$$p = \varepsilon_0 \varepsilon_r \left(\frac{V}{z}\right)^2$$

$\varepsilon_0 \varepsilon_r$: dielectric constant
V: voltage
z: thickness of elastomer The compression force moves the dielectric elastomer so as to drive a variable focus lens of the present disclosure, and the compression force is proportional to the square of a dielectric constant and a voltage and inversely proportional to the square of a thickness of the dielectric elastomer. As the compression force is increased, a displacement in which the dielectric elastomer can be moved upward or downward is increased.

Figure 2:
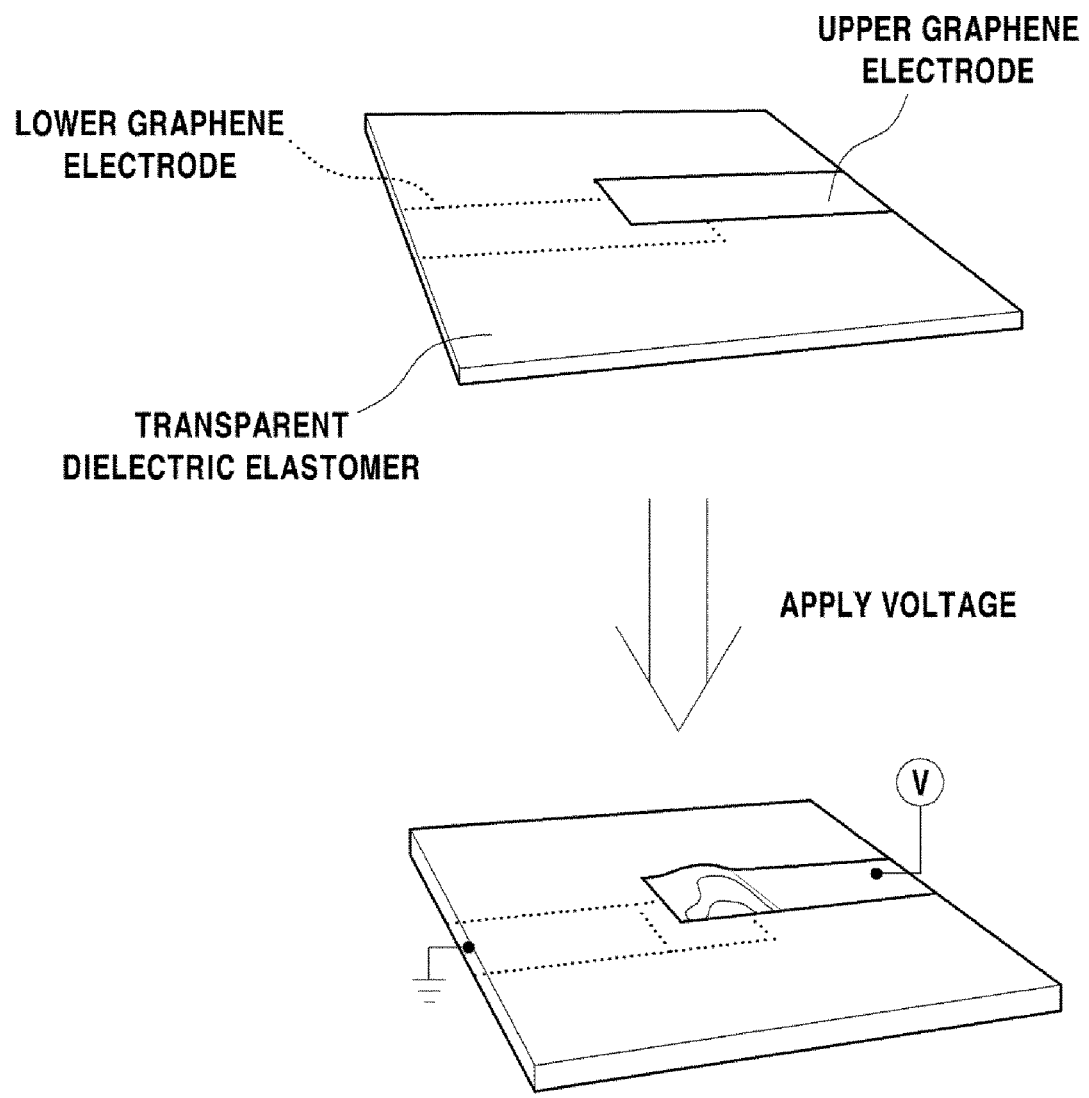
FIG. 2 is a schematic view showing a driving method of a variable focus lens in accordance with an illustrative embodiment of the present disclosure.

FIG. 2 is a schematic view of a variable focus lens in accordance with the present disclosure. An upper graphene electrode and a lower graphene electrode are respectively provided above and under the dielectric elastomer layer. When a voltage is applied between the upper graphene electrode and the lower graphene electrode, a dielectric elastomer at that portion is moved by the compression force, and, thus, a focus is changed. In this case, a dielectric elastomer around the graphene electrodes but not between the graphene electrodes is not affected by application of the voltage and not applied with the compression force, and, thus, it is not moved. Therefore, the dielectric elastomer can serve as the "fixed support".

By way of example, the graphene may be formed by using a method typically used in the art for growing graphene without particular limitation. By way of example, the graphene may be formed by a Chemical Vapor Deposition (CVD) method, an epitaxial method, or a mechanical exfoliating method, but the present illustrative embodiment may not be limited thereto.

By way of example, for forming the graphene, a chemical vapor deposition method may be used, but the present illustrative embodiment may not be limited thereto. By way of example, the chemical vapor deposition method may include, but may not be limited to, rapid thermal chemical vapor deposition (RTCVD), inductively coupled plasma-chemical vapor deposition (ICP-CVD), low pressure chemical vapor deposition (LPCVD), atmospheric pressure chemical vapor deposition (APCVD), metal organic chemical vapor deposition (MOCVD) or plasma-enhanced chemical vapor deposition (PECVD).

A process of growing the graphene can be carried out under an atmospheric pressure, a low pressure, or a vacuum. By way of example, if the process is carried out under an atmospheric pressure, helium (He) may be used as a carrier gas, so that it is possible to minimize damage to graphene caused by collisions between the carrier gas and argon (Ar) which is heavy at high temperatures. Further, if the process is carried out under an atmospheric pressure, it has advantage that it is possible to synthesis a large scale graphene film through a simple process with low cost. Meanwhile, if the process is carried out under a low pressure or a vacuum, hydrogen ($H_2$) is used as an ambient gas and by increasing a temperature, and thus, an oxidized surface of a metallic catalyst is reduced, so that high-quality graphene can be synthesized.

The graphene formed by the above-described method may have a large scale with a horizontal and/or longitudinal length of about 1 mm to about 1000 m. Further, the graphene may have a homogeneous structure with few or zero defects. The graphene formed by the above-described method may include a single layer or multilayers of graphene. For non-limited example, a thickness of the graphene layer can be adjusted in a range of from about 1 layer to about 100 layers.

The graphene may be formed on a substrate. A shape of the substrate is not particularly limited and for example, the substrate may include a shape such as a roll shape, a foil shape, a wire shape, a plate shape, a tube shape, or a net shape, but the illustrative embodiment may not be limited thereto.

Further, a material of the substrate is not particularly limited and for example, may include one or more selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, Ge, and a polymer, but the illustrative embodiment may not be limited thereto. If the substrate is made of metal, the metal substrate can serve as a catalyst for forming graphene.

However, the substrate is not necessarily made of metal. By way of example, the substrate may be using a silicone, and a substrate additionally formed silicone oxide layer on the silicone substrate by oxidizing the silicone substrate for forming a catalyst layer is formed on the silicone substrate may be used, but the illustrative embodiment may not be limited thereto. Further, the substrate may be a polymer substrate and may include silicone, polyimide (PI), polyethersulfone (PES), polyether ether ketone (PEEK), polyethylene terephthalate (PET), or polycarbonate (PC), but the illustrative embodiment may not be limited thereto. As a method for forming graphene on the polymer substrate, all the above-described chemical vapor deposition methods can be used. More desirably, the method may be carried out by a plasma chemical vapor deposition method at a low temperature in a range of from about 100° C. to about 600° C., but the illustrative embodiment may not be limited thereto.

Further, a catalyst layer may be formed on the substrate to make it easy to grow graphene. The catalyst layer is not limited in material, thickness, and shape. By way of example, the catalyst layer may be made of one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge, and may be made of the same material or a different material as compared with the substrate, but the illustrative embodiment may not be limited thereto. Further, the catalyst layer is not limited in thickness and can be thin film or thick film, but the illustrative embodiment may not be limited thereto.

In accordance with an illustrative embodiment of forming graphene on the substrate, a thin film-shaped or foil-shaped metal substrate formed in a roll is put in a pipe-shaped furnace, a reactant gas containing a carbon source is supplied thereto, and a heat treatment is performed under an atmospheric pressure to grow graphene, but the illustrative embodiment may not be limited thereto. If a heat treatment is performed in a range of, for example, from about 300° C. to about 2000° C. while the carbon source such as carbon monoxide, carbon dioxide, methane, ethane, ethylene, ethanol, acetylene, propane, butane, butadiene, pentane, pentene, cyclopentadiene, hexane, cylcohexane, benzene, and toluene is supplied in the form of gas, carbon components contained in the carbon source are combined with each other to form a hexagonal plate structure and graphene can be grown, but the illustrative embodiment may not be limited thereto.

Then, the graphene formed as described above may be transferred onto the substrate by various methods. The transfer method is not particularly limited as long as it is typically used in the art for transferring graphene. By way of example, a dry process, a wet process, a spray process, or a roll-to-roll process may be used. More desirably, in order to transfer large scale graphene by a simple process at low cost, a roll-to-roll process may be used, but the illustrative embodiment may not be limited thereto.

By way of example, the transparent electrode layer containing the graphene may be formed by transferring the graphene to the transparent dielectric elastomer, but the illustrative embodiment may not be limited thereto. Since the graphene has an excellent Young's modulus and thus has a high mechanical strength, characteristics of the transparent electrode may not be greatly changed even if a shape of the lens is changed.

In accordance with an illustrative embodiment of the present disclosure, each of the transparent electrode layers independently includes the graphene having about 20 layers or less, but the illustrative embodiment may not be limited thereto. By way of example, the transparent electrode layers may independently include 1 layer, 2 layers, 3 layers, 4 layers, 5 layers, 6 layers, 7 layers, 8 layers, 9 layers, 10 layers, 11 layers, 12 layers, 13 layers, 14 layers, 15 layers, 16 layers, 17 layers, 18 layers, 19 layers, or 20 layers of graphene, but the illustrative embodiment may not be limited thereto. By way of example, as the number of layers of graphene included in the transparent electrode layer is increased, it becomes easier to prevent breakage of the transparent electrode caused by a change in shape of the variable focus lens and a voltage is uniformly formed while the variable focus lens is driven, but the illustrative embodiment may not be limited thereto. By way of example, as the number of layers of graphene included in the transparent electrode layer is increased, a light transmittance of the transparent electrode layer may be decreased.

In accordance with an illustrative embodiment of the disclosure, each of the transparent electrode layers may have a visible light transmittance of about 50% or more, but the illustrative embodiment may not be limited thereto.

By way of example, each of the transparent electrode layers may have a visible light transmittance of about 50% or more, about 55% or more, about 60% or more, about 65% or more, about 70% or more, about 75% or more, about 80% or more, about 85% or more, about 90% or more, or about 95% or more, but the illustrative embodiment may not be limited thereto.

In accordance with an illustrative embodiment of the present disclosure, the transparent electrode layers may be connected to a positive electrode and a negative electrode of a power supply, respectively, by using graphene or carbon black, but the illustrative embodiment may not be limited thereto.

In accordance with an illustrative embodiment of the present disclosure, the transparent dielectric elastomer layer may include a member selected from the group consisting of silicone, polyurethane, polydimethylsiloxane (PDMS), acryl, and combinations thereof, but the illustrative embodiment may not be limited thereto. By way of example, the transparent dielectric elastomer layer may include VHB tape synthesized by 3M, but the illustrative embodiment may not be limited thereto.

In accordance with an illustrative embodiment of the present disclosure, a thickness of the transparent dielectric elastomer layer may be about 1 cm or less, but the illustrative embodiment may not be limited thereto. By way of example, a thickness of the transparent dielectric elastomer layer may be from about 10 μm to about 1 cm, from about 50 μm to about 1 cm, from about 100 μm to about 1 cm, from about 500 μm to about 1 cm, from about 1 mm to about 1 cm, from about 5 mm to about 1 cm, from about 10 μm to about 5 mm, from about 10 μm to about 1 mm, from about 10 μm to about 500 μm, from about 10 μm to about 100 μm, from about 10 μm to about 50 μm, or from about 50 μm to about 200 μm, but the illustrative embodiment may not be limited thereto.

In accordance with an illustrative embodiment of the present disclosure, a thickness of the transparent electrode layer may be about 50 nm or less, but the illustrative embodiment may not be limited thereto. By way of example, a thickness of the transparent electrode layer may be from about 0.1 nm to about 50 nm, from about 1 nm to about 50 nm, from about 10 nm to about 50 nm, from about 20 nm to about 50 nm, from about 0.1 nm to about 10 nm, or from about 0.1 nm to about 1 nm, but the illustrative embodiment may not be limited thereto.

In accordance with an illustrative embodiment of the present disclosure, a dielectric constant of the transparent dielectric elastomer layer may be in a range of from about 1 to about 50, but the illustrative embodiment may not be limited thereto. By way of example, a dielectric constant of the transparent dielectric elastomer layer may be in a range of from about 1 to about 50, from about 1 to about 30, from about 1 to about 10, from about 1 to about 5, from about 5 to about 50, from about 10 to about 50, or from about 30 to about 50, but the illustrative embodiment may not be limited thereto.

In accordance with an illustrative embodiment of the present disclosure, a shape of the transparent dielectric elastomer layer may include wholly or partially, a flat shape, a concave shape on the both sides, a convex shape on the both sides, a concave shape on any one side, or a convex shape on any one side, but the illustrative embodiment may not be limited thereto.

In accordance with an illustrative embodiment of the present disclosure, in the variable focus lens, a refraction index of the transparent dielectric elastomer layer may be varied by changing a voltage applied to the transparent electrode layer, but the illustrative embodiment may not be limited thereto.

In accordance with the second aspect of the present disclosure, a preparing method of a variable focus lens comprises forming a transparent electrode layer containing graphene on at least a part of each of both sides of a transparent dielectric elastomer layer.

In accordance with an illustrative embodiment of the present disclosure, the forming the transparent electrode layer containing graphene on at least a part of both sides of the transparent dielectric elastomer layer may include transferring graphene to at least a part of each of both sides of the transparent dielectric elastomer layer, but the illustrative embodiment may not be limited thereto.

In accordance with an illustrative embodiment of the present disclosure, the preparing method may further include electrically connecting the transparent electrode layers to a positive electrode and a negative electrode of a power supply, respectively, but the illustrative embodiment may not be limited thereto. By way of example, the electrically connecting the transparent electrode layers to a positive electrode and a negative electrode of a power supply, respectively, may be carried out by using carbon black and/or graphene, but the illustrative embodiment may not be limited thereto.

In accordance with an illustrative embodiment of the present disclosure, the transferring may be carried out by a method selected from the group consisting of wet transfer, dry transfer, roll-to-roll transfer, and combinations thereof, but the illustrative embodiment may not be limited thereto.

By way of example, the transferring graphene may be carried out by using PDMS, PMMA, or thermal release tape, or by using a roll, but the illustrative embodiment may not be limited thereto. By way of example, transferring graphene on the substrate may include transferring a single layer or multilayers of graphene, but the illustrative embodiment may not be limited thereto.

In accordance with the third aspect of the present disclosure, a focus controlling method of a variable focus lens comprises applying a voltage to the transparent electrodes formed on the both sides of the variable focus lens in accordance with the first aspect of the present disclosure to generate a potential difference between the transparent electrodes so as to vary a focus of the variable focus lens. The third aspect of the present disclosure relates to the focus controlling method of the variable focus lens in accordance with the first aspect of the present disclosure, and detailed description of components similar or corresponding to those of the first aspect of the present disclosure will be omitted, but the components explained in the first aspect of the present disclosure will be applied the same to those of the third aspect of the present disclosure although explanation thereof is omitted in third aspect of the present disclosure. By way of example, the focus controlling method of a variable focus lens may include applying a voltage to the transparent electrodes formed on the both sides of the variable focus lens to generate a potential difference between the respective transparent electrodes so as to vary a shape of the transparent dielectric elastomer layer included in the variable focus lens according to the driving principle illustrated in FIG. 1, thereby controlling a focus of the variable focus lens, but the illustrative embodiment may not be limited thereto.

In accordance with the fourth aspect of the present disclosure, a display device comprises the variable focus lens in accordance with the first aspect of the present disclosure. The fourth aspect of the present disclosure includes the variable focus lens in accordance with the first aspect of the present disclosure, and detailed description of components similar or corresponding to those of the first aspect of the present disclosure will be omitted, but the components explained in the first aspect of the present disclosure will be applied the same to those of the fourth aspect of the present disclosure although explanation thereof is omitted in fourth aspect of the present disclosure. By way of example, the display device may be used in a notebook computer, a monitor, a television, or a mobile device, but the illustrative embodiment may not be limited thereto.

By way of example, if the variable focus lens is used in the display device, autostereoscopic 3D display can be implemented by a lenticular method instead of a conventional 3D display method using glasses, but the illustrative embodiment may not be limited thereto.

Hereinafter, there will be provided detailed explanation with reference to examples. However, the following examples are provided only for illustration, not for limitation of the scope of the present disclosure.

EXAMPLE

1. Synthesis of Graphene

In the present example, graphene was synthesized by using Cu foil having a thickness of about 25 μm. Firstly, the Cu foil was inserted into a quartz tube and fixed therein. Then, the quartz tube was heated to about 1000° C. while flowing $H_2$ at about 2 sccm. After a temperature of the quartz tube reached about 1000° C., the quartz tube was annealed for about 30 minutes while maintaining the flow of the hydrogen and a pressure thereof. Thereafter, a gas mixture ($CH_4$: $H_2$=20 sccm: 2 sccm) containing a carbon source was supplied for about 30 minutes to grow graphene on the Cu foil, and then, the quartz tube was cooled to room temperature at a rate of ~10° C./s in a short time while flowing $H_2$, thereby obtaining the graphene grown on the Cu foil.

2. Transfer of Graphene on Transparent Dielectric Elastomer

In the present example, the graphene was transferred on a transparent dielectric elastomer by wet transfer or roll-to-roll transfer.

Firstly, in the case of roll-to-roll transfer, the graphene grown on one of both sides of the Cu foil was removed through an oxygen plasma process, and the graphene on the other side was attached to one side of a silicone substrate as the transparent dielectric elastomer by using a roll-to-roll method. Thereafter, the Cu foil was etched to transfer the graphene on the silicone substrate, thereby transferring single layer of graphene on the silicone substrate. In the case of wet transfer, PMMA was spin-coated on the graphene grown on one side of the Cu foil, and the graphene on the other side was removed through an oxygen plasma process. After the Cu foil was etched and removed, the graphene was transferred on the silicone substrate. Thereafter, the above-described method was carried out to the same side or the other side of the silicone substrate, so that 3 layers of graphene were transferred to each of the both sides of the silicone substrate. Thus, a transparent electrode was formed on each of the both sides of the silicone substrate.

3. Drives of Variable Focus Lens and Measurement of Displacement

Figure 3:
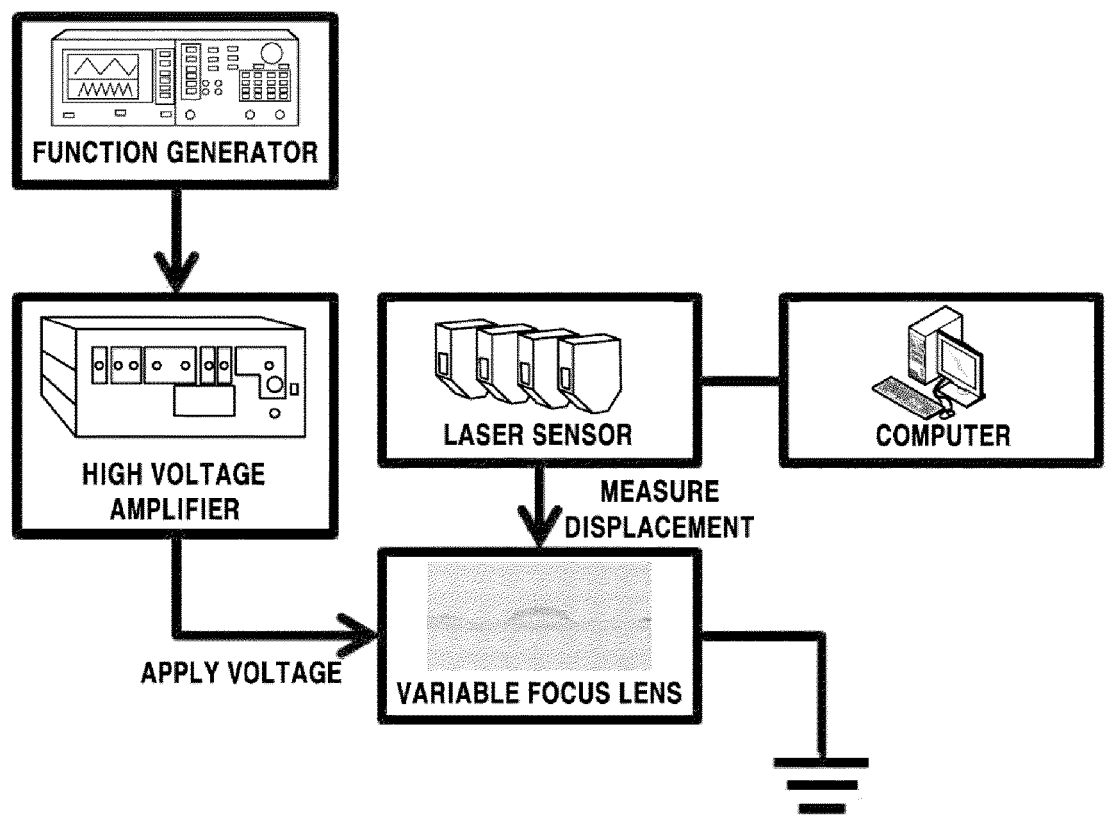
FIG. 3 is a schematic view showing experimental devices required for analyzing characteristics of a variable focus lens and relation thereof in accordance with an example of the present disclosure.

A voltage source supplied from a function generator (AFG3021+R5) was amplified by a high voltage amplifier (Trek 10/10B-HS), and a voltage was supplied to two transparent electrodes connected thereto. A displacement of a lens induced by the supplied voltage was checked in real time with a laser displacement sensor (Keyence LK-G150) configured to irradiate a laser to the lens in a vertical direction and sense a wavelength of a reflected laser (FIG. 3). The applied voltage was in a range of from about 0 kV to about 3.5 kV, and a resolution of the laser displacement sensor was used about 0.1 μm and a frequency thereof was in a range of from about 0.2 Hz to about 2 Hz.

Figure 4:
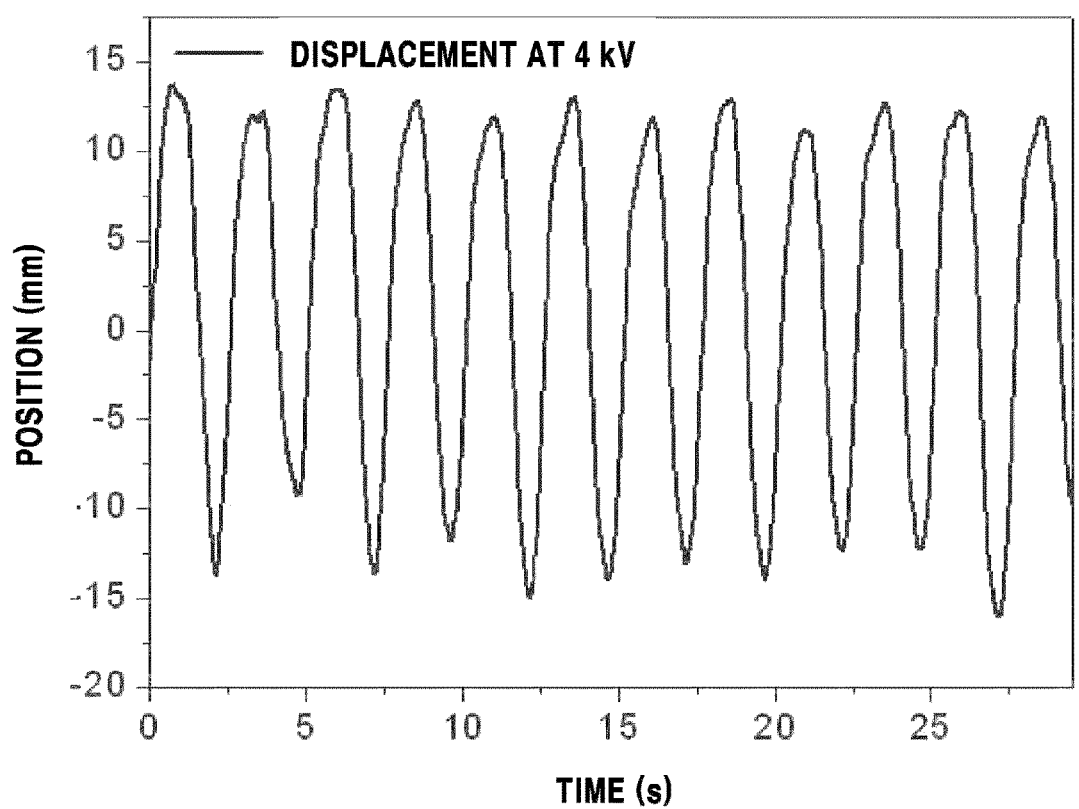
FIG. 4 is a graph showing a measurement result of a displacement of a variable focus lens in accordance with an example of the present disclosure.

4. Measurement of Displacement Caused by Applying of Voltage to Variable Focus Lens In the present example, a voltage was applied to a variable focus lens using 3 layers of graphene transferred on each of both sides of a transparent silicone substrate as a transparent electrode, and a displacement of the variable focus lens was measured by using the laser displacement sensor. When a voltage of about 4 kV was applied, a result of displacement measurement of the variable focus lens was as shown in FIG. 4. Referring to FIG. 4, it can be seen that a shape of the variable focus lens was changed by applying of a voltage.

5. Change in Characteristic of Transparent Electrode Depending on Number of Layers of Graphene In the present example, the number of layers of graphene transferred on both sides of a transparent silicone substrate was adjusted to analyze characteristics of a transparent electrode containing the graphene.

Figure 5:
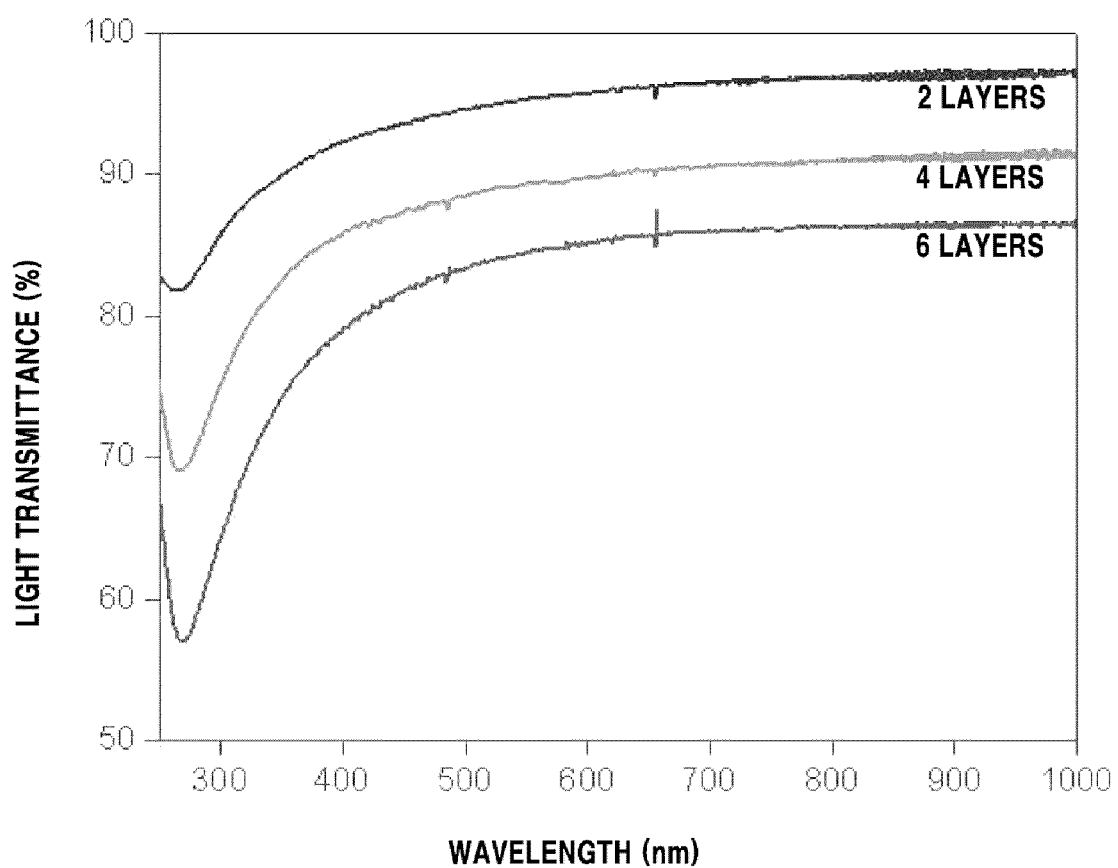
FIG. 5 is a graph showing a measurement result of light transmittance of a transparent electrode in accordance with an example of the present disclosure.

Firstly, a change in light transmittance of the transparent electrode depending on the number of layers of graphene transferred was analyzed by using UV-vis-NIR spectroscope (Agilent 8453) (FIG. 5). Referring to FIG. 5, it can be seen that as the number of layers of graphene contained in the transparent electrode was increased, a light transmittance was decreased. To be specific, at a wavelength of about 550 nm, when the transparent electrode contained 2 layers of graphene, a light transmittance was about 95.2%, when the transparent electrode contained 4 layers of graphene, a light transmittance was about 89.3%, and when the transparent electrode contained 6 layers of graphene, a light transmittance was measured about 84.5%.

Figure 6:
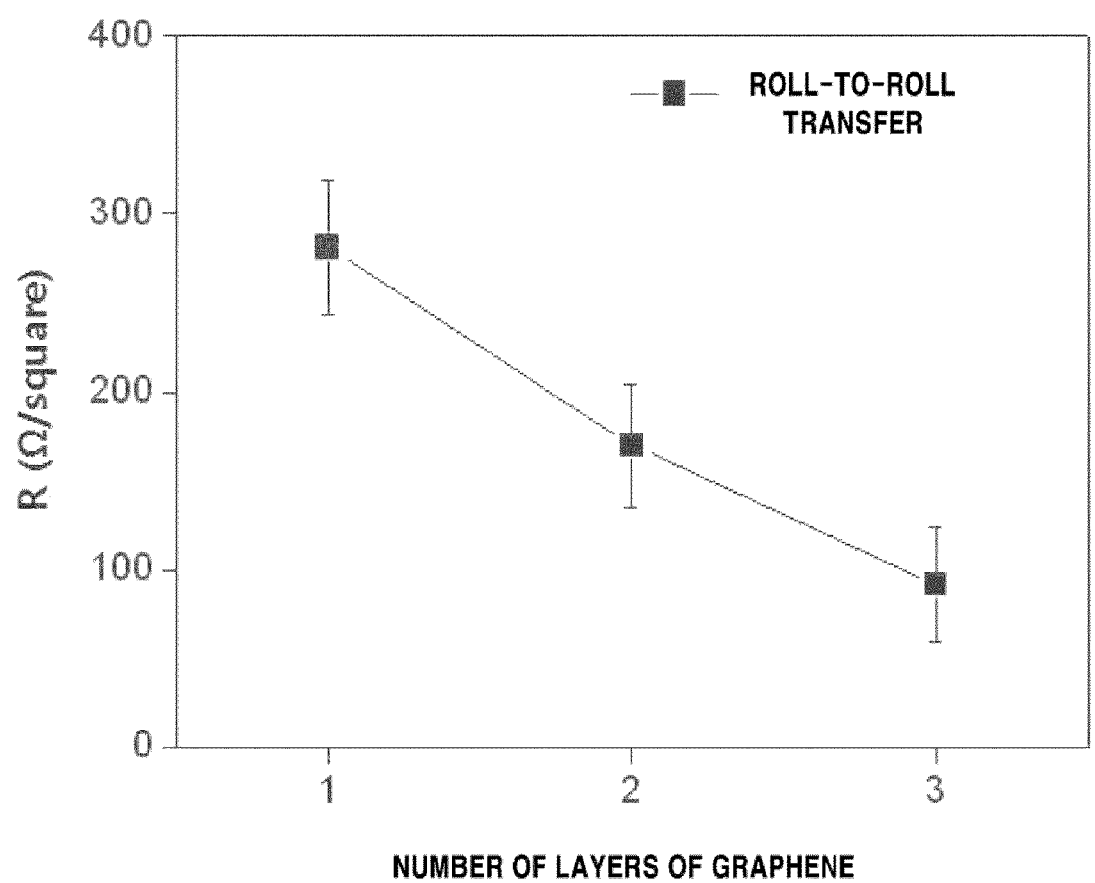
FIG. 6 is a graph showing a measurement result of sheet resistance of a transparent electrode in accordance with an example of the present disclosure.

Then, a change in sheet resistance of the transparent electrode depending on the number of layers of graphene transferred by the roll-to-roll method was analyzed by using a sheet resistance meter (four-point probe system, AIT CMT-100 MP) (FIG. 6). Referring to FIG. 6, it can be seen that as the number of layers of graphene contained in the transparent electrode was increased, a sheet resistance was decreased.

Figure 7:
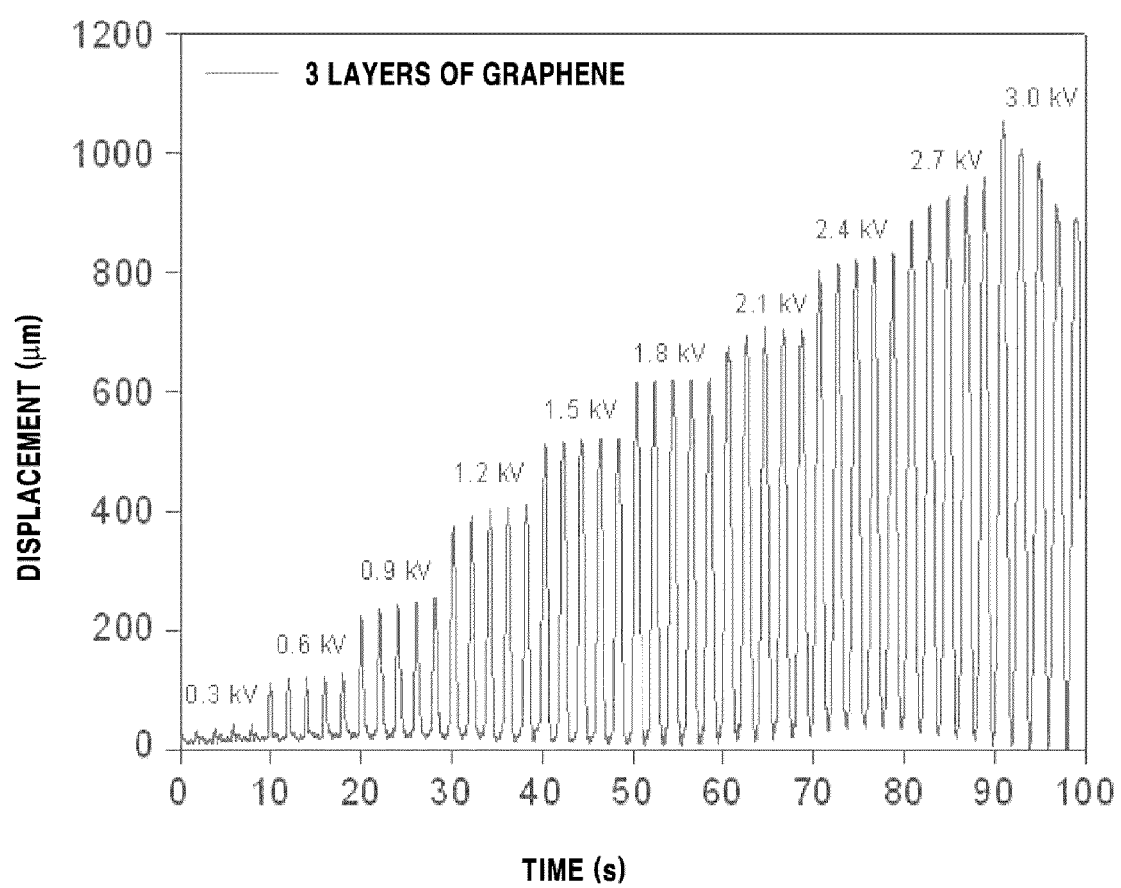
FIG. 7 is a graph showing a measurement result of a displacement of a variable focus lens in accordance with an example of the present disclosure.
Figure 8:
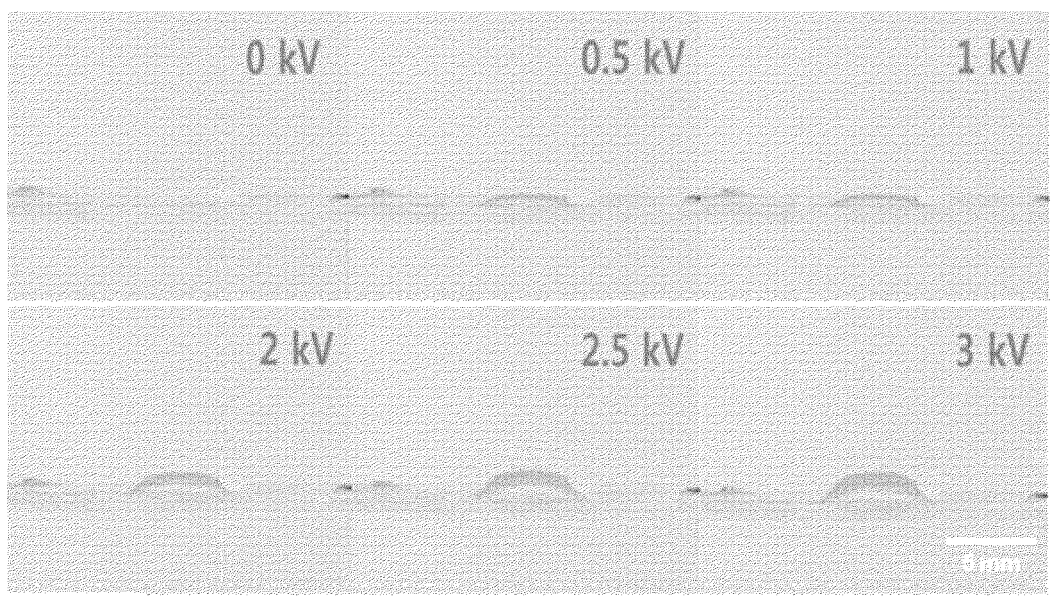
FIG. 8 provides photos showing drives of a variable focus lens in accordance with an example.

6. Change in Displacement of Variable Focus Lens Depending on Change in Applied Voltage In the present example, a change in displacement of a variable focus lens depending on a change in an applied voltage through a transparent graphene electrode included in both sides of the variable focus lens was measured. FIG. 7 is a graph showing a measurement result of a displacement of the variable focus lens while gradually changing an applied voltage in a range of from about 0.3 kV to about 3.0 kV. It can be seen that as an applied voltage was increased, a displacement was increased. FIG. 8 provides photos showing that when an applied voltage was gradually changed in a range of about 0 kV to about 3 kV, the variable focus lens was changed in displacement and driven. Referring to FIG. 8, it can be seen that as an applied voltage was increased, a displacement of the variable focus lens was increased, and, thus, a change in focus was also increased.

Figure 9:
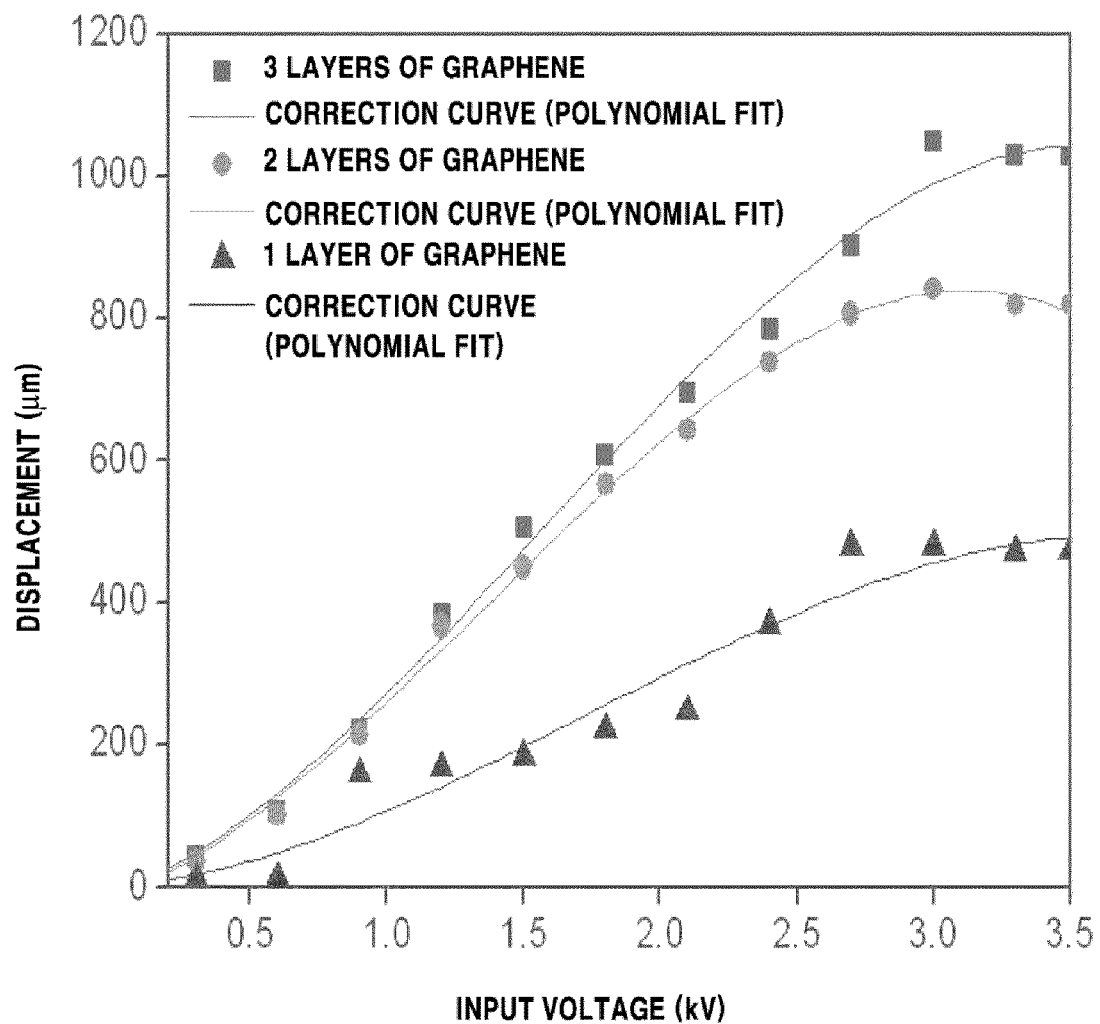
FIG. 9 is a graph showing a measurement result of a displacement of a variable focus lens in accordance with an example of the present disclosure.

7. Change in Displacement of Variable Focus Lens Depending on Number of Layers of Graphene Contained in Transparent Electrode In the present example, a change in displacement of a variable focus lens depending on the number of layers of graphene was measured by varying the number of layers of graphene contained in a transparent electrode under the same voltage applied. Referring to FIG. 9, it can be seen that as the number of layers of graphene was increased under the same voltage applied, a displacement of the variable focus lens was increased. This is because as the number of layers of graphene was increased, breakage of the electrode caused by movement of the lens could be prevented, and the voltage could be constantly maintained even when the lens was driven. Further, it was confirmed that regardless of the number of layers of graphene, when an applied voltage was about 3 kV or more, there was no further change in displacement.

8. Change in Displacement of Variable Focus Lens Depending on Applied Frequency

Figure 10:
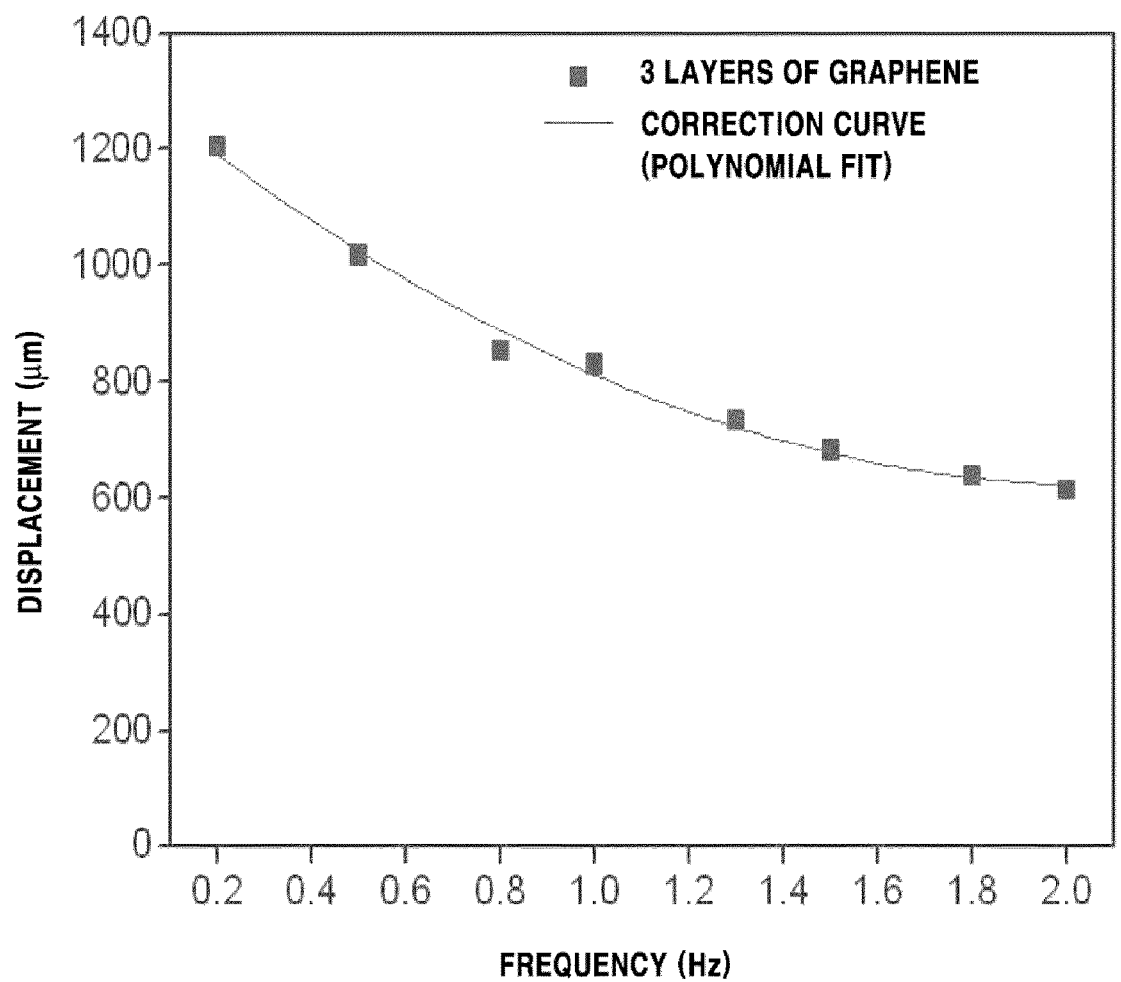
FIG. 10 is a graph showing a measurement result of a displacement of a variable focus lens in accordance with an example of the present disclosure.

In the present example, by using a variable focus lens in which 3 layers of graphene was contained in each of both sides of a transparent electrode, a change in displacement of the variable focus lens depending on changing an applied frequency was measured. FIG. 10 is a graph showing the maximum displacement at each frequency applied to the variable focus lens. Referring to FIG. 10, it can be seen that a displacement of the variable focus lens was decreased dependently on an increase in frequency.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A variable focus lens comprising:
a transparent dielectric elastomer layer;
a first transparent electrode layer containing graphene formed on at least a part of a first side of the transparent dielectric elastomer layer in an absence of external force on the transparent dielectric elastomer layer; and
a second transparent electrode layer containing graphene formed on at least a part of a second side of the transparent dielectric elastomer layer in an absence of external force on the transparent dielectric elastomer layer;
wherein the first transparent electrode layer on the first side of the transparent dielectric elastomer layer overlaps the second transparent electrode layer on the second side of the transparent dielectric elastomer layer when viewed in a direction perpendicularly to the transparent dielectric elastomer layer and forms a focus area in the overlap comprising the first transparent electrode layer in the overlap, the second transparent electrode layer in the overlap, and the transparent dielectric elastomer layer in the overlap; and
wherein the variable focus lens is configured such that a focus through the transparent dielectric elastomer layer, the first transparent electrode layer and the second transparent electrode layer in only the focus area is varied by controlling a voltage applied to the first and the second transparent electrode layers to exert a compression force on the transparent dielectric elastomer layer.

2. The variable focus lens of claim 1, wherein each of the first and second transparent electrode layers independently includes the graphene having about 20 layers or less.

3. The variable focus lens of claim 1, wherein each of the first and second transparent electrode layers has a visible light transmittance of about 50% or more.

4. The variable focus lens of claim 1, wherein the transparent dielectric elastomer layer includes a member selected from the group consisting of silicone, polyurethane, polydimethylsiloxane (PDMS), acryl, and combinations thereof.

5. The variable focus lens of claim 1, wherein a thickness of the transparent dielectric elastomer layer is about 1 cm or less.

6. The variable focus lens of claim 1, wherein a dielectric constant of the transparent dielectric elastomer layer is in a range of from about 1 to about 50.

7. The variable focus lens of claim 1, wherein a shape of the transparent dielectric elastomer layer includes wholly or partially, a flat shape, a concave shape on both the first and second sides, a convex shape on both the first and second sides, a concave shape on any one of the first and second sides, or a convex shape on any one of the first and second sides.

8. The variable focus lens of claim 1, wherein a refraction index of the transparent dielectric elastomer layer is varied by changing the voltage applied to the first and second transparent electrode layers.

9. A preparing method of a variable focus lens comprising:
forming a first transparent electrode layer containing graphene on at least a part of a first side of a transparent dielectric elastomer layer in absence of external force on the transparent dielectric elastomer layer; and
forming a second transparent electrode layer containing graphene on at least a part of a second side of the transparent dielectric elastomer layer in absence of external force on the transparent dielectric elastomer layer;
wherein the first transparent electrode layer on the first side of the transparent dielectric elastomer layer overlaps the second transparent electrode layer on the second side of the transparent dielectric elastomer layer when viewed in a direction perpendicularly to the transparent dielectric elastomer layer and forms a focus area in the overlap comprising the first transparent electrode layer in the overlap, the second transparent electrode layer in the overlap, and the transparent dielectric elastomer layer in the overlap; and
wherein the variable focus lens is configured such that a focus through the transparent dielectric elastomer layer, the first transparent electrode layer and the second transparent electrode layer in only the focus area is varied by controlling a voltage applied to the first and the second transparent electrode layers to exert a compression force on the transparent dielectric elastomer layer.

10. The preparing method of a variable focus lens of claim 9, wherein the forming of the first and second transparent electrode layers containing graphene on the transparent dielectric elastomer layer includes transferring graphene to the at least the part of the first side of the transparent dielectric elastomer layer and to the at least the part of the second side of the transparent dielectric elastomer layer.

11. The preparing method of a variable focus lens of claim 10, wherein the transferring of graphene is carried out by a method selected from the group consisting of wet transfer, dry transfer, roll-to-roll transfer, and combinations thereof.

12. A display device comprising:
the variable focus lens of claim 1.

13. A variable focus lens comprising:
a transparent dielectric elastomer layer;
a first transparent electrode layer containing at least one first graphene layer formed on at least a part of a first side of the transparent dielectric elastomer layer in an absence of external force on the transparent dielectric elastomer layer; and
a second transparent electrode layer containing at least one second graphene layer formed on at least a part of a second side of the transparent dielectric elastomer layer in an absence of external force on the transparent dielectric elastomer layer;

wherein the first transparent electrode layer on the first side of the transparent dielectric elastomer layer overlaps the second transparent electrode layer on the second side of the transparent dielectric elastomer layer when viewed in a direction perpendicularly to the transparent dielectric elastomer layer and forms a focus area in the overlap comprising the first transparent electrode layer in the overlap, the second transparent electrode layer in the overlap, and the transparent dielectric elastomer layer in the overlap;

wherein the variable focus lens is configured such that a displacement of transparent dielectric elastomer layer and a focus through the transparent dielectric elastomer layer, the first transparent electrode layer and the second transparent electrode layer in only the focus area is varied by controlling a voltage applied to the first and second transparent electrode layers to exert a compression force on the transparent dielectric elastomer layer, and wherein the displacement of the transparent dielectric elastomer layer changes depending on a number of the at least one graphene layer contained in the first transparent electrode layer and/or the second transparent electrode layer.

\* \* \* \* \*